United States Patent [19]
Umeda et al.

[11] Patent Number: 5,982,064
[45] Date of Patent: Nov. 9, 1999

[54] DC MOTOR

[75] Inventors: Fumihiro Umeda, Yonago; Shuji Takahashi, Tottori, both of Japan

[73] Assignee: Nidec Corporation, Kyoto, Japan

[21] Appl. No.: 09/098,862

[22] Filed: Jun. 17, 1998

[30]     Foreign Application Priority Data

Jun. 17, 1997  [JP]  Japan ..................................... 9-160232
Dec. 27, 1997  [JP]  Japan ..................................... 9-369016

[51] Int. Cl.$^6$ ....................................................... H02K 5/00
[52] U.S. Cl. ................................ 310/90; 310/89; 310/61; 310/62; 310/75 D
[58] Field of Search ................................ 310/40, 89, 61, 310/62, 64, 75 A, 75 D

[56]          References Cited

U.S. PATENT DOCUMENTS 4,613,778  9/1986  Wrobel et al. .
5,000,589  3/1991  Ogata et al. .

FOREIGN PATENT DOCUMENTS 5-219708  8/1993  Japan .

*Primary Examiner*—Nestor Ramirez
*Assistant Examiner*—Thanh Lam
*Attorney, Agent, or Firm*—McCormick, Paulding & Huber LLP

[57]              ABSTRACT

The DC motor according to the present invention includes one radial ball bearing and a thrust bearing constituted by a shaft receiving member provided on a housing to be abutted by one end of a rotating shaft. Further, a magnetic and/or a spring bias force is applied to the rotating shaft to supplement thrust load bearing force of the thrust bearing. Compared with conventional DC motors in which a rotor is supported by a shaft through a pair of ball bearings which are axially spaced apart from each other, the present invention enables reduction of the overall motor height without harming the rotational stability while simultaneously achieving low production cost.

36 Claims, 4 Drawing Sheets

DC MOTOR

BACKGROUND OF THE INVENTION

The present invention relates to DC motors, more particularly, although not limited thereto, DC motors for driving electric equipment such as, for example, copy machines, laser printers and/or storage medium drives for personal computers. The present invention is also applicable to DC motors for driving fans for cooling electronic equipment and for cooling heat sinks for cooling electric components. Further, the present invention relates to heat sink fans employing such DC motors.

In recent years, personal computers, have shifted to a notebook type from a laptop type and are required to have thinner design, and accordingly DC motors for the personal computers are required to be thinner. In conventional DC motors, a rotating member is supported by a stationary member through a pair of ball bearings which are axially spaced apart from each other. Therefore, the construction of the rotating member, the stationary member and the ball bearings limits the amount of reduction in the axial height of the motor, namely motor thinness. If a thinner motor design is achieved, then this motor can not only effectively be applied to storage medium drives of notebook type personal computers, but is also instrumental in minimizing the height of a heat sink fan to be mounted on a semiconductor device. In various uses of DC motors as mentioned above, a decrease in motor volume provides significant advantage as well.

However, stability of motor performance is not guaranteed if, for example, one of a pair of ball bearings is merely removed or eliminated to reduce the axial height of the motor.

SUMMARY OF THE INVENTION

It is an object of the present invention to provide a DC motor having a low overall height (low profile) and yet showing rotational stability.

It is another object of the present invention to provide a DC motor having small overall height and low production cost and yet showing rotational stability.

It is yet another object of the present invention to provide a heat sink fan that is compact in size and low in price.

The DC motor according to the present invention includes one radial bearing means for bearing radial load and a thrust bearing means constituted by a shaft receiving member provided on a housing to be abutted by one end of a rotating shaft. Compared with conventional DC motors in which a rotor is supported by a shaft through a pair of ball bearings which are axially spaced apart from each other, the present invention enables reduction of the overall motor height while simultaneously achieving a low production cost.

Furthermore, a magnetic and/or a spring biasing force is applied to the rotating shaft axially to establish a thrust load bearing force of the thrust bearing means such that stability of rotation is ensured with a simple structure.

The foregoing and other objectives, features, and advantages of the invention will be more readily understood on consideration of the following detailed description of the invention, taken in conjunction with the accompanying drawings.

DETAILED DESCRIPTION OF THE PREFERRED EMBODIMENTS

With reference to the accompanying drawings, explanation will be made about the embodiments of the present invention. Although all the embodiments are shown, as being applied to a heat sink fan or an axial flow fan, it is clear to those ordinarily skilled in the art that the constructions of their motor portions can also be applied to other types of motors such as spindle motors for driving hard disks and other data storage media for personal computers.

Figure 1:
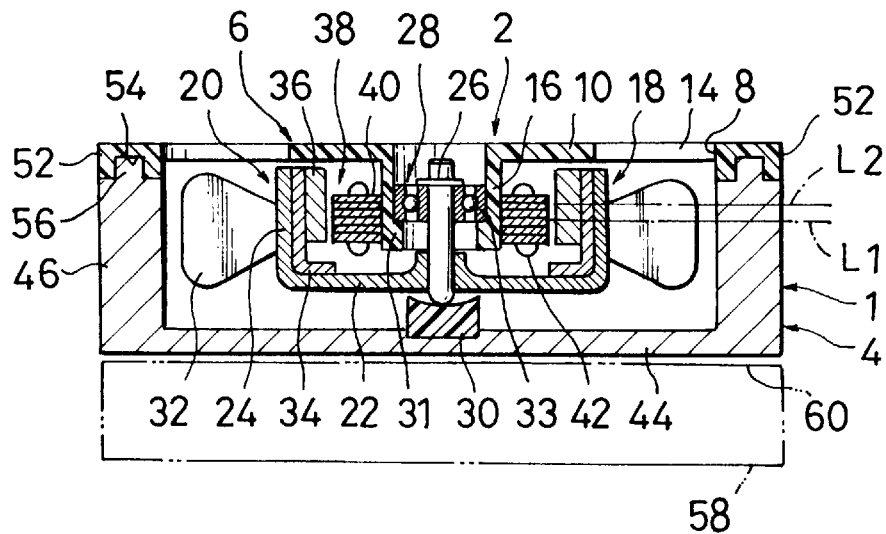
FIG. 1 is a cross-sectional view of a first embodiment of the DC motor of the present invention as applied to a heat sink fan motor.
Figure 2:
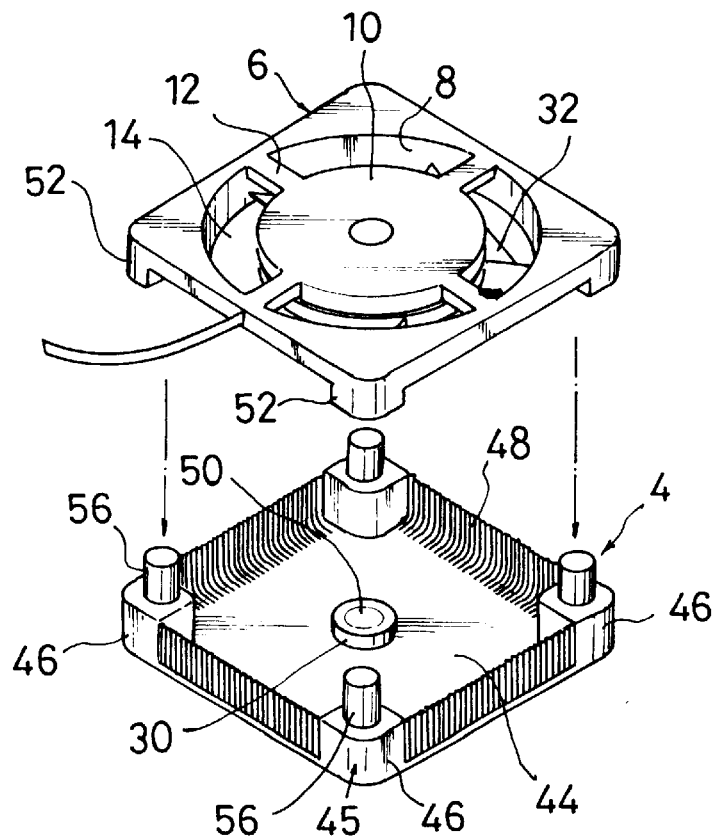
FIG. 2 is an exploded perspective view of the first embodiment shown in FIG. 1.
Figure 3:
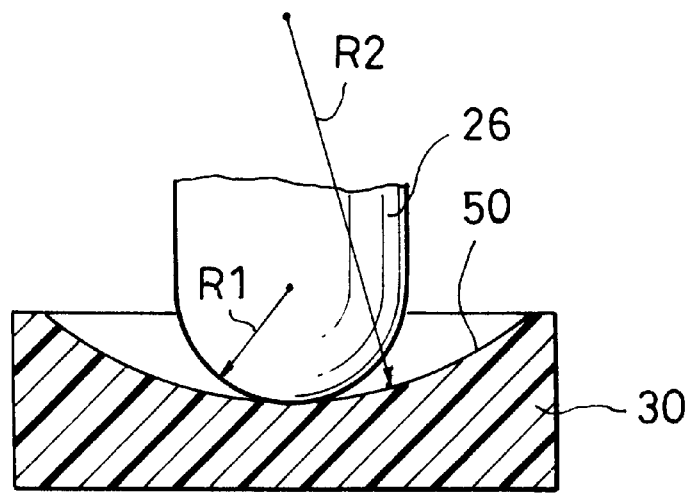
FIG. 3 is an enlarged partial sectional view of the thrust bearing means of the heat sink fan shown in FIG. 1.

FIGS. 1 to 3 illustrate a first embodiment of the DC motor according to the present invention that is used for a heat sink fan. As shown in FIGS. 1 and 2, the heat sink fan 1 includes a heat sink 4 and a housing 6. The housing 6 is made of synthetic resin and has a substantially rectangular configuration and a circular opening 8. A circular supporting member 10 for supporting a fan motor 2 is provided in the opening 8 of the housing 6 and connected to the housing 6 through a plurality of radial webs 12. As shown in FIG. 2, air passages 14 are defined between the housing 6 and the supporting member 10 to establish communication between the outside and inside of the housing 6.

A cylindrical sleeve 16 is integrally formed with the supporting member 10 and a rotor 18 is rotatably supported by the sleeve 16. The rotor 18 includes a cup-shaped rotor body 20 having a top wall 22 and circumferential side wall 24 extending toward the housing 6 from the outer perimeter of the radial end wall 22. A shaft 26 is fixedly fitted to a central through-hole in end wall 22 such that one end of a shaft 26 extends through the end wall 22. The shaft 26 is rotatably supported by the sleeve 16 through a single ball bearing 28 which constitutes a radial bearing means for bearing radial load. Further, the end of the shaft 26 projecting from the end wall 22 is riotatably supported by the heat sink 4 through a thrust bearing means (which will be explained more in detail later) for bearing thrust load. In this embodiment, a stepped portion 31 is formed on the inner circumferential wall of the sleeve 16 and the outer race 33 of the ball bearing 28 is fixed by adhesive to the sleeve 16 in such a manner that the outer race of the ball bearing 28 is in contact with the stepped portion 31 and the inner circumferenrial wall of the sleeve 16.

A plurality of fan blades 32 are circumferentially for med on the outside of the circumferential wall 24 of the rotor body 20 so as to be circumferentially spaced apart from each other. Further, an annular rotor magnet 36 is secured on the inner surface of the circumferential wall 24 through an annular yoke 34. An annular stator 38 has a core 40 and a coil 42 wound around the core. The and the stator core 40 is mounted on the outer surface of the sleeve 16 of the housing 6 to oppose and interact with the rotor magnet 36.

As shown in FIG. 2, the heat sink 4 includes a base plate 44 and side walls 45 and has a substantially rectangular configuration that corresponds to the configuration of the housing 6. Except for corners 46, the side walls 45 are formed by a plurality of radiating fins 48 extending toward the housing 6 from the base plate 44. The radiating fins 48 may be formed by a plurality of slits formed on the side walls 45. A shaft receiving member 30 which constitutes a thrust bearing means is mounted on the central portion of the base plate 44 for supporting the end of the shaft 26. The shaft receiving member 30 has a cylindrical configuration and is fixedly fitted in a circular concave portion or cavity formed on the base plate 44. The shaft receiving member 30 is made of either synthetic resin material, ceramic material, wear resistant metallic material or oil impregnated metallic material. The heat sink 4 is made of aluminum or other good heat conductive material.

As shown in FIG. 3, the end of the shaft 26 is formed in a hemispherical configuration and abuts against the shaft receiving member 30. A hemispherical concave portion 50 which receives the end of the shaft 26 is formed on the surface of the shaft receiving member 30. The radius of curvature R1 of the hemispherical end of the shaft 26 is larger than half of the diameter d of the shaft 26 (R1≧d/2) and is smaller than the radius of curvature R2 of the concave portion 50 of the shaft receiving member 30 (as expressed in the formula of R2>R1). Because the radii of curvature R1 and R2 are established as described above, the end of the shaft 26 and the shaft receiving member 30 make substantially a pin point contact with each other as shown in FIG. 3 so that the shaft 26 is stably and rotatably supported by the shaft receiving member 30 while minimizing the bearing rotational efficiency loss.

As shown in FIGS. 1 and 2, the housing 6 is provided with a depression 54 on each corner 52 . A projection of 56 is formed on each corner 46 of the heat sink 4 to respectively correspond to a depression 54. Each projection 56 of the heat sink 4 is inserted into a corresponding depression 54 of the housing 6 so that the housing 6 and the heat sink 4 are detachably coupled with each other.

In this embodiment, a fan motor 2 is constructed such that the shaft 26 is magnetically urged toward the shaft receiving member 30. As shown in FIG. 1, the axial magnetic center of the stator 30 is at a position as indicated by the phantom line L1 and the axial magnetic center of the rotor magnet 36 to is at an axially displaced upwardly position as indicated by phantom line L2. Consequently, the magnetic center of the rotor magnet 36 is displaced upwardly toward the housing 6 from the magnetic center of the stator 30 and the rotor 18 is magnetically urged downwardly toward the shaft receiving member 30 by the magnetic action between the stator 30 and the rotor magnet 36. This magnetic force also acts to urge the ball bearing 28 downwardly, and the shaft 26 is thus stably supported on the shaft receiving member 30.

As shown in FIG. 1, the base plate 44 is to be directly mounted on an electronic component 58 to be cooled by the heat sink fan 1, such as a microprocessor. The base plate 44 is fixed on the electric component by a double-side adhesive tape, adhesive, fixing screws etc. When the heat sink fan 1 may be mounted on the electronic component 58, the heat generated by the electronic component 58 as shown is conducted to the entire heat sink 4 through the base plate 44 and radiated by an air flow that is generated by a plurality of fan blades 32 turning with the rotation of the rotor 18, with the air flow passing by each radiating fin 48.

In this embodiment, the fan motor 2 is constructed such that the shaft 26 is rotatably supported by means of single ball bearing 28 and the shaft receiving member 30, so that the overall height of the motor is smaller as compared with a conventional fan motor having two ball bearings axially spaced apart from each other. Further, since the fan motor 2 of the present invention requires only one ball bearing 28, the motor may be produced at low cost.

Figure 4:
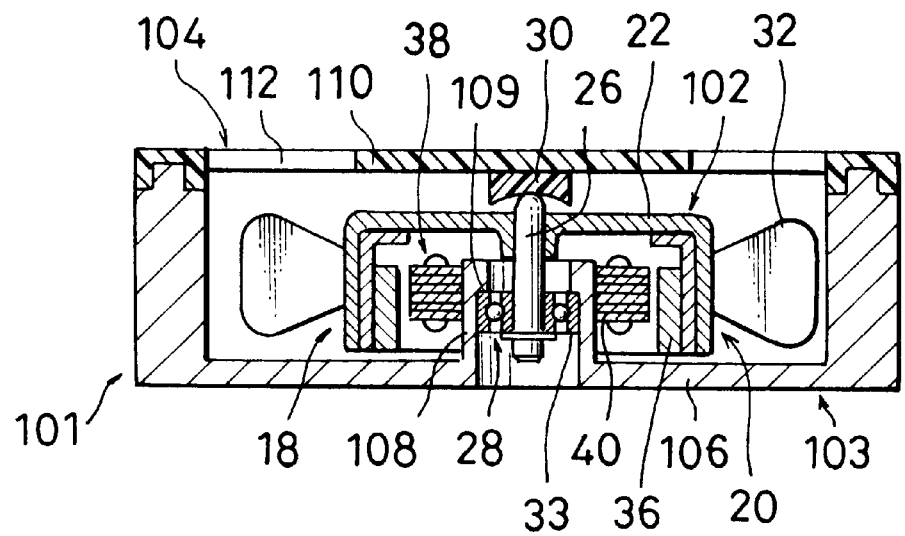
FIG. 4 is a cross-sectional view of a second embodiment of the DC motor of the present invention when used as a heat sink fan motor.

FIG. 4 shows a second embodiment of the DC motor of the present invention for use as a heat sink fan motor. In FIG. 4, a heat sink fan 101 includes a heat sink 103 which is to be mounted on an electronic component to be cooled, and a housing 104 coupled with the heat sink 103. The heat sink 103 has a substantially rectangular base plate 106 and the fan motor 102 is rotatably supported by the base plate 106. A sleeve 108 is integrally formed with the base plate 106 at the central portion of the base plate 106 and extends toward the housing 104. The shaft 26 is fixedly fitted to the rotor 18 and is rotatably supported by the sleeve 108 through single ball bearing 28 which constitutes a radial bearing means. A stepped portion or annular shoulder 109 is formed on the inner circumferential wall of the sleeve 108 and the outer race 33 of the ball bearing 28 is secured by adhesive on the inner circumferential wall of the sleeve 108 in contact with the stepped portion 109 and the inner circumferential wall of the sleeve 108. One end of the shaft 26 passes through the top wall 22. A stator core 40 of the stator 38 is mounted on the outer circumferential wall of the sleeve 108 to oppose the rotor magnet 36.

The housing 104 has a substantially rectangular supporting member 110 and air passages 112 are formed around the supporting member 110 as in the case of the housing 8 shown in FIGS. 1 and 2. A shaft receiving member 30 is mounted on a supporting member 110 at the central portion thereof for rotatably supporting the end of the shaft 26 which projects upwardly from the top wall 22.

The magnetic center of the rotor magnet 36 is displaced toward the base plate 106 from the magnetic center of stator 38. The axial rotor 18 is therefore magnetically biased toward the axial shaft receiving member 30 by the magnetic action between the stator 38 and the rotor magnet 36.

In the fan motor 102 shown in FIG. 4, the shaft 26 is rotatably supported by one ball bearing 28 interposed between the heat sink 103 and the rotor 18 and by the shaft receiving member 30 interposed between the shaft 26 and the housing 104. As the result the overall height of the fan motor 102 is minimized and the motor may be produced at low cost.

Figure 5:
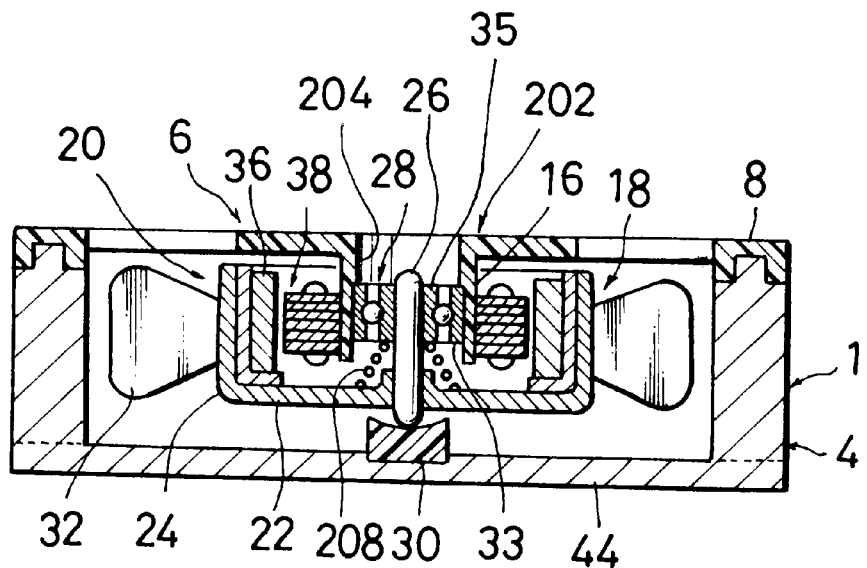
FIG. 5 is a cross-sectional view of a third embodiment of the DC motor of the present invention when used as a heat sink fan motor.

FIG. 5 shows a third embodiment of the DC motor of the present invention for use as a heat sink fan motor. In FIG. 5, a stepped portion 204 is formed on the inner circumferential wall of the sleeve 16 of the housing 8 for receiving an outer race 33 of ball bearing 28 the outer race is fixed by adhesive on the inner circumferential wall of the sleeve 16 in contact with the stepped portion 204 and the inner circumferential wall of the sleeve 16. The shaft 26, of which one end is fixed in to the rotor body 20, is held inside of inner race 35 of the ball bearing 28 which, in turn, is secured to the sleeve 16 as described to be rotatably supported by the sleeve through the ball bearing 28.

In this embodiment, a spring 208 is employed to bias the shaft 26 and ball bearing 28. The spring 208 comprises a compression coil spring of which one end is larger than the other end in terms of outer diameter. The end of the spring 208 of the larger diameter is fixed on the inner surface of the top wall 22 of the rotor 18 while the other end of the smaller diameter abuts against the inner race 35 of the ball bearing 28. Because the spring 208 is disposed between the inner surface of the top wall 22 and the inner race 35 of the ball bearing 28, the inner race 35 of the ball bearing 28 is urged toward the housing 8. Further, the spring 208 acts on the top wall 22 of the rotor 18 to urge the rotor 18 toward the heat sink 4, as the result, the end of the shaft 26 which projects downwardly from the top wall 22 to is resiliently pressed against the shaft receiving thrust member 30.

The fan motor 202 of this embodiment exploits the spring 208, thus the ball bearing 28 is urged by elastic restitution of the spring 208 and the shaft 26 is held in position with its one end pressed against the shaft receiving member 30 by the resilient force. In place of a coil spring, a belleville spring, for example, or a spring of other type or shape can also be used.

Figure 6:
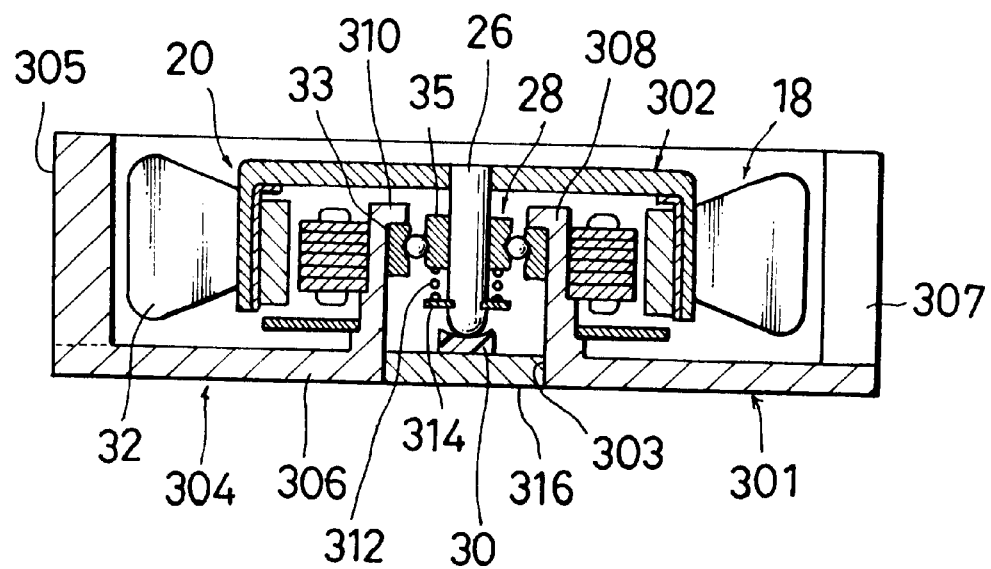
FIG. 6 is a cross-sectional view of a forth embodiment of the DC motor of the present invention when used as a heat sink fan motor.

FIG. 6 shows a forth embodiment of the DC motor of the present invention for use as a heat sink fan motor. As shown in FIG. 6, the heat sink fan 301 includes a fan motor 302 and a heat sink 304. The heat sink 304 has a base plate 306 of a substantially rectangular geometry and side walls 305. As in the case of the first embodiment of the present invention, a plurality of radiating fins 307 are provided on the side walls 305. The base plate 306 has a circular hole 303 formed at its central portion and a sleeve 308 is integrally formed with the base plate and extends upwardly from the inner edge thereof. An annular flange 310 projects radially inward from the upper end of the sleeve 308 for restraining the outer race 33 of the ball bearing 28 which as above constitutes a radial bearing means. The outer race 33 of the ball bearing 28 is fixed by adhesive to the inner circumferential wall of the sleeve 308 in contact with the annular flange 310. Further shaft 26 of which one end is fixed in the rotor body 302 is held in the inner race 35 of the ball bearing 28 so as to be rotatably supported by the sleeve 308 through the ball bearing.

Fan motor 302 employs a spring 312 to bias the shaft 26 with ball bearing 28. The spring 312 comprises a compression coil spring of which one end is in contact with a washer 314, fixed to the shaft 26, with the other end in contact with inner race 35 of the ball bearing 28. Because the spring 312 is interposed between the washer 314 and the inner race 35 of the ball bearing 28, the inner race 35 of the ball bearing 28 is resiliently urged in the direction opposite the base plate 306, by the force of the spring 312.

A disc-shaped cover plate 316 is secured in circular hole 303 of the base plate 306 and a shaft receiving thrust member 30 is mounted on the inner surface of the cover plate with the free end of the shaft 26 supported by the shaft receiving member. The spring 312 resiliently urges the shaft 26 through the washer 314 toward the cover plate 316 and the shaft 26 thereby abuts against the shaft receiving member 30 under resilient force.

In FIG. 6, the fan motor 302 is supported by the base plate 306 and the shaft 26 is rotatably supported by the shaft receiving member 30 mounted on the cover plate 316, without requiring a housing member. As a result, the overall height of the heat sink fan 301 can be further reduced.

Figure 7:
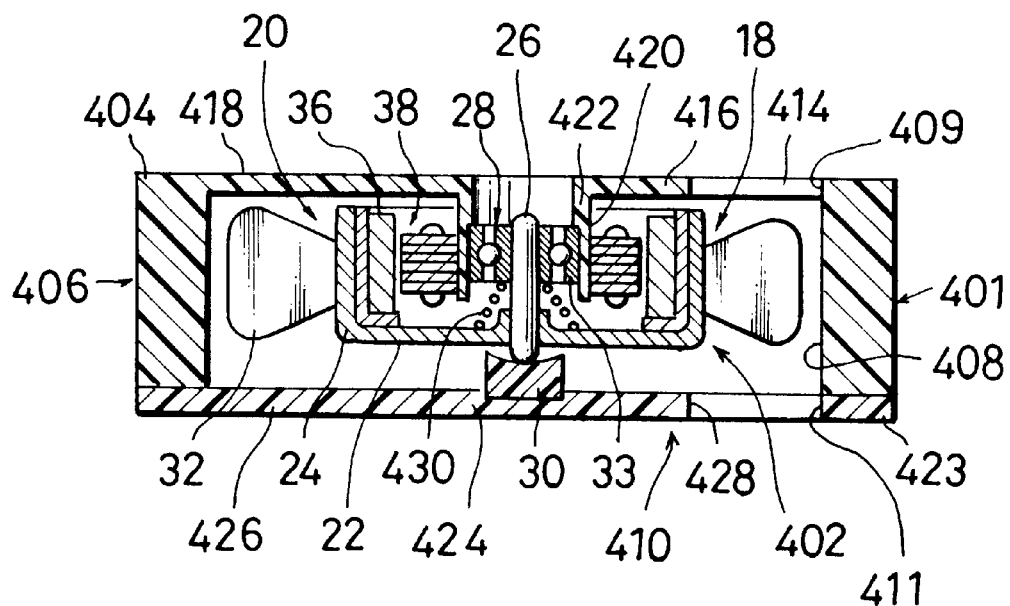
FIG. 7 is a cross-sectional view of a fifth embodiment of the DC motor of the present invention when used as an axial fan motor.

FIG. 7 shows a fifth embodiment of the DC motor of the present invention for use as an axial flow fan motor. An axial flow fan 401 shown in FIG. 7 includes a housing 404 and a cover 410 coupled with the housing 404. The housing 404 has side walls 406 extending from the outer periphery of the housing 404 and a cylindrical air passage way 408 is formed inside of the side walls 406. The housing 404 and the cover 410 are made of, for example, a synthetic resin.

The housing 404 has circular openings 409 formed for the air passage way 408. A circular supporting member 416 is disposed within the circular openings 409 and is connected to the housing 404 through a plurality of webs 418. Openings 414 through which air passes are defined between the inner edge of the housing 404 and the supporting member 416.

A sleeve 420 is integrally formed with the supporting member 416 and the shaft 26 is rotatably supported by the sleeve through a single ball bearing 28 which constitutes a radial bearing means. A stepped portion 422 is formed on the inner circumferential wall of the sleeve 420 for receiving the ball bearing 28. The outer race 33 of the ball bearing 28 is secured by adhesive on the inner circumferential wall of the sleeve 420 in contact with the stepped portion 422 and the wall of the sleeve.

Cover 410 shown in FIG. 7 has a configuration corresponding to the external shape of the housing 404. Circular openings 411 are formed on the cover 410 for defining the air passage way 408. A circular plate member 424 is disposed centrally of the opening 411 and is connected to the cover 410 through a plurality of supporting members 426 having substantially the same configuration as that of the webs 12 in FIG. 2. Openings 428 are formed between the inner edge of cover member 423 and the plate member 424 for permitting air flow.

The shaft receiving member 30 is mounted at the central portion of plate member 424 and supports one end of the shaft 26.

In the embodiment shown in FIG. 7, when the fan motor 402 rotates, air flow is generated in the axial direction of the fan motor 402 by the action of a plurality of fan blades 32 formed on the rotor 18 and air flows through the air passage way 408.

The fan motor 402 employs a compression spring 430 to bias the ball bearing 28 upwardly as well as the rotor 18 downwardly toward the shaft receiving thrust member 30. Thus, the ball bearing 28 is biased by the elastic restitution of the spring 430 as in the case of the third embodiment of the present invention shown in FIG. 5. As the result the end of the shaft 26 abuts is the shaft receiving member 30 and held in position. A belleville spring, for example, or a spring of other type or shape can also be used for a spring 430 in place of the coil spring.

Figure 8:
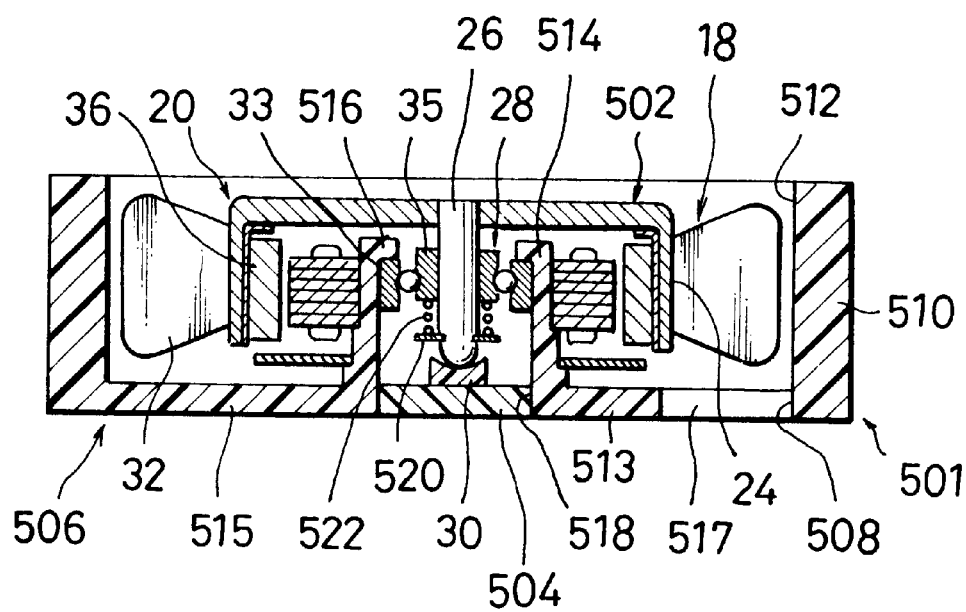
FIG. 8 is a cross-sectional view of a sixth embodiment of the DC motor of the present invention when used as an axial fan motor.

FIG. 8 shows a sixth embodiment of the DC motor of the present invention for use as an axial flow fan motor. The axial flow fan 501 shown in FIG. 8 includes a fan motor 502 and a housing 506 with side walls 510 extending from the outer periphery of the housing 506 and a cylindrical air passage way 512 formed within the side walls 510. Circular openings 508 corresponding to the air passage way 512 are formed in the housing 506. A circular supporting member 513 is provided within the circular openings 508 and is connected to the housing 506 through a plurality of webs 515. Openings 517 are formed between the inner edge of the housing 506 and the supporting member 513 for permitting air flow in the axial flow fan 501.

Supporting member 513 has a circular hole 518 at its central portion and a sleeve 514 which is integrally formed with the supporting member 513 and extends upwardly from the inner edge of the member 513. An annular flange 516 projects radially inwardly from the upper end of the sleeve 514 for receiving the outer race 33 of the ball bearing 28 which constitutes a radial bearing means. The outer race 33 of the ball bearing 28 is fixed by adhesive to the sleeve 514 in contact with the annular flange 516 and the inner circumferential wall of the sleeve 514. Furthermore, the shaft 26 of which one end is fixed in fitted to the rotor body is held in the inner race 35 of the ball bearing 28 which is secured to the sleeve 514 so that the shaft 26 is rotatably supported by the sleeve 514 through the ball bearing 28.

The fan motor 502 employs a compression spring 522 to bias the shaft 26 and ball bearing 28. The spring 522 comprises a cylindrical coil spring having one end in contact with a washer 520 is fixed to the shaft 26 and other end in contact with the inner race 35 of the ball bearing 28. Because the spring 522 is interposed between the washer 520 and the inner race 35 of the ball bearing 28, the inner race 35 of the ball bearing 28 is urged by the spring force in the direction opposite from the supporting member 513 of the housing 506.

A disc-shaped cap member 504 is secured in a circular hole 518 of the supporting member 513 of the housing 506. The shaft receiving member 30 is secured on the inner surface of the cap member 504 and the free end of the shaft 26 is supported by the shaft receiving member 30. The spring 522 urges by its resilient force the shaft 26 toward the cap member 504 through the washer 520. As the result, the shaft 26 is resiliently urged against the shaft receiving member 30.

In the embodiment shown in FIG. 8, when the fan motor 502 rotates, air flow is generated in the axial direction of the fan motor 502 by the action of a plurality of fan blades 32 formed on the rotor 18, and the air flows through the air passage way 508 accordingly.

The fan motor 502 employs spring 522 to bias the ball bearing 28 as well as the rotor 18 and shaft 26 toward the shaft receiving member 30. Therefore, as in the case of the forth embodiment of the present invention shown in FIG. 6, the fan motor 502 is supported by the housing 506 in the axial flow fan 501 shown in FIG. 8, and the shaft 26 is rotatably supported by the shaft receiving member 30 mounted on the cap member 504, without requiring cover members. As the result, the overall height of the axial flow fan 501 can be further reduced.

As seen in the above mentioned embodiments, the sleeve 16, 108, 308, 420 and 514 is formed on the base plate 44, 106 and 306 (see FIGS. 1, 4, 5 and 6), the housing 6, 104, 404 and 506 (see FIGS. 1, 4, 5, 7 and 8), the cover plate member 316 (see FIG. 6), the supporting 10, 110, 416 and 513 (see FIGS. 1, 4, 7 and 8) or the cup member 504 (see FIG. 8). Those members having the sleeve thereon, may be generally referred to as a base member. Likewise, the members on which the shaft receiving member is mounted, may be generally referred to as stationary members.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A DC motor comprising:

a stationary member;

a shaft rotatable relative to the stationary member;

a rotor fixed on one end of the shaft;

a base plate having a sleeve member for rotatably supporting the shaft;

a retaining portion formed in the inner circumferential surface of the sleeve member;

a ball bearing including an inner race and an outer race and a plurality of balls disposed therebetween, and interposed between the shaft and the sleeve member, the outer race being fixed to the sleeve member so as to be in contact with the inner circumferential surface of the sleeve member and the retaining portion and the inner race holding the shaft;

a stator attached to the base plate;

a rotor magnet secured to the rotor so as to oppose the stator, a shaft receiving member fixedly mounted on the stationary member at a position to oppose one end of the shaft and having a curved concave portion against which the one end of the shaft abuts; and biasing means for urging the shaft toward the shaft receiving member.

2. A DC motor according to claim 1, wherein the rotor magnet is located such that a magnetic center of the rotor magnet deviates from a magnetic center of the stator in the direction opposite from the shaft receiving member whereby the magnetic attraction force of the rotor magnet acts to urge the shaft against the shaft receiving member.

3. A DC motor according to claim 1, wherein the biasing means includes a spring member interposed between the inner race of the ball bearing and the rotor whereby a force of elastic restitution of the spring member acts to urge the shaft against the shaft receiving member.

4. A DC motor comprising:

a housing;

a sleeve member connected to the housing;

a shaft rotatably supported by the sleeve member;

a rotor fixed on one end of the shaft;

a retaining portion formed in the inner circumferential surface of the sleeve member;

a ball bearing including an inner race and an outer race and a plurality of balls disposed therebetween, and interposed between the shaft and the sleeve member, the outer race being fixed to the sleeve member so as to be in contact with the inner circumferential surface of the sleeve member and the retaining portion and the inner race holding the shaft;

a stator attached to the sleeve member;

a rotor magnet secured to the rotor so as to oppose the stator;

a shaft receiving member provided on the housing at a position to oppose a free end of the shaft and having a curved concave portion against which the free end of the shaft abuts; and biasing means for urging the shaft toward the shaft receiving member.

5. A DC motor according to claim 4, wherein the rotor magnet is located such that a magnetic center of the rotor magnet deviates from a magnetic center of the stator in the direction opposite from the shaft receiving member whereby the magnetic attraction force of the rotor magnet acts to urge the shaft against the shaft receiving member.

6. A DC motor according to claim 4, wherein the biasing means includes a spring member interposed between the inner race of the ball bearing and the rotor whereby a force of elastic restitution of the spring member acts to urge the shaft against the shaft receiving member.

7. A fan motor comprising:

a housing having an air passage way;

a supporting plate having a sleeve member and connected to the housing through a plurality of webs;

a shaft rotatably supported by the sleeve member;

a rotor fixed on one end of the shaft and having a plurality of fan blades;

a retaining portion formed in the inner circumferential surface of the sleeve member;

a ball bearing including an inner race and an outer race and a plurality of balls disposed therebetween, and interposed between the shaft and the sleeve member, the outer race being fixed to the sleeve member so as to be in contact with the inner circumferential surface of the sleeve member and the retaining portion and the inner race holding the shaft;

a stator attached to the base plate;

a rotor magnet secured to the rotor so as to oppose the stator;

a shaft receiving member fixedly mounted on the housing at a position to oppose one end of the shaft and having a curved concave portion against which the one end of the shaft abuts; and biasing means for urging the shaft toward the shaft receiving member.

8. A fan motor according to claim 7, wherein the rotor magnet is located such that a magnetic center of the rotor magnet deviates from a magnetic center of the stator in the direction opposite from the shaft receiving member whereby the magnetic attraction force of the rotor magnet acts to urge the shaft against the shaft receiving member.

9. A fan motor according to claim 7, wherein the biasing means includes a spring member interposed between the inner race of the ball bearing and the rotor whereby a force of elastic restitution of the spring member acts to urge the shaft against the shaft receiving member.

10. A fan motor comprising:

a housing having an air passage way;

a supporting plate having a sleeve member and connected to the housing through a plurality of webs;

a shaft rotatably supported by the sleeve member;

a rotor fixed on one end of the shaft and having a plurality of fan blades;

a retaining portion formed in the inner circumferential surface of the sleeve member;

a ball bearing including an inner race and an outer race and a plurality of balls disposed therebetween, and interposed between the shaft and the sleeve member, the outer race being fixed to the sleeve member so as to be in contact with the inner circumferential surface of the sleeve member and the retaining portion and the inner race holding the shaft;

a stator attached to the base plate;

a rotor magnet secured to the rotor so as to oppose the stator;

a shaft receiving member fixedly mounted on the base plate at a position to oppose a free end of the shaft and having a curved concave portion against which the free end of the shaft abuts; and biasing means for urging the shaft toward the shaft receiving member.

11. A fan motor according to claim 10, wherein the rotor magnet is located such that a magnetic center of the rotor magnet deviates from a magnetic center of the stator in the direction opposite from the shaft receiving member whereby the magnetic attraction force of the rotor magnet acts to urge the shaft against the shaft receiving member.

12. A fan motor according to claim 10, wherein the biasing means includes a spring member interposed between the inner race of the ball bearing and the rotor whereby a force of elastic restitution of the spring member acts to urge the shaft against the shaft receiving member.

13. A heat sink fan comprising:

a heat sink having a base member and a plurality of radiating fins formed on the base member;

a housing attached to the heat sink and having an air passage;

a supporting plate having a sleeve member and connected to the housing through a plurality of webs;

a shaft rotatably supported by the sleeve member;

a rotor fixed on one end of the shaft and having a plurality of fan blades;

a retaining portion formed in the inner circumferential surface of the sleeve member;

a ball bearing including an inner race and an outer race and a plurality of balls disposed therebetween, and interposed between the shaft and the sleeve member, the outer race being fixed to the sleeve member so as to be in contact with the inner circumferential surface of the sleeve member and the retaining portion and the inner race holding the shaft;

a stator attached to the base plate;

a rotor magnet secured to the rotor so as to oppose the stator;

a shaft receiving member fixedly mounted on the housing at a position to oppose to one end of the shaft and having a curved concave portion against which the one end of the shaft abuts; and biasing means for urging the shaft toward the shaft receiving member.

14. A heat sink fan according to claim 13, wherein the rotor magnet is located such that a magnetic center of the rotor magnet deviates from a magnetic center of the stator in the direction opposite from the shaft receiving member whereby the magnetic attraction force of the rotor magnet acts to urge the shaft against the shaft receiving member.

15. A heat sink fan according to claim 13, wherein the biasing means includes a spring member interposed between the inner race of the ball bearing and the rotor whereby a force of elastic restitution of the spring member acts to urge the shaft against the shaft receiving member.

16. A heat sink fan comprising:

a heat sink having a base member and a plurality of radiating fins formed on the base member;

a housing attached to the heat sink and having an air passage;

a supporting plate having a sleeve member and connected to the housing through a plurality of webs;

a shaft rotatably supported by the sleeve member;

a rotor fixed on one end of the shaft and having a plurality of fan blades;

a retaining portion formed in the inner circumferential surface of the sleeve member;

a ball bearing including an inner race and an outer race and a plurality of balls disposed therebetween, and interposed between the shaft and the sleeve member, the outer race being fixed to the sleeve member so as to be in contact with the inner circumferential surface of the sleeve member and the retaining portion and the inner race holding the shaft;

a stator attached to the base plate;

a rotor magnet secured to the rotor so as to oppose the stator;

a shaft receiving member fixedly mounted on the heat sink at a position to oppose to a free end of the shaft and having a curved concave portion against which the free end of the shaft abuts; and biasing means for urging the shaft toward the shaft receiving member.

17. A heat sink fan according to claim 16, wherein the rotor magnet is located such that a magnetic center of the rotor magnet deviates from a magnetic center of the stator in the direction opposite from the shaft receiving member whereby the magnetic attraction force of the rotor magnet acts to urge the shaft against the shaft receiving member.

18. A heat sink fan according to claim 16, wherein the biasing means includes a spring member interposed between the inner race of the ball bearing and the rotor whereby a force of elastic restitution of the spring member acts to urge the shaft against the shaft receiving member.

19. A DC motor comprising:

a stationary member;

a shaft rotatable relative to the stationary member and the one end of the shaft having a hemispherical configuration with a radius of curvature R1;

a rotor fixed on the other end of the shaft;

a base plate having a sleeve member for rotatably supporting the shaft;

a retaining portion formed in the inner circumferential surface of the sleeve member;

a ball bearing including, an inner race and an outer race and a plurality of balls disposed therebetween, and interposed between the shaft and the sleeve member, the outer race being; fixed to the sleeve member so as to be in contact with the inner circumferential surface of the sleeve member and the retaining portion and the inner race holding the shaft;

a stator attached to the base plate;

a rotor magnet secured to the rotor so as to oppose the stator;

a shaft receiving member fixedly mounted on the stationary member at a position to oppose the one end of the shaft and having a curved concave configuration with a radius of curvature R2 which is larger than the radius of curvature R1, the hemispherical end of the shaft and the curved concave portion being in contact with each other by pin point contact; and biasing means for urging the shaft toward the shaft receiving member.

20. A DC motor comprising:

a housing;

a sleeve member connected to the housing;

a shaft rotatably supported by the sleeve member and the one end of the shaft having a hemispherical configuration with a radius of curvature R1;

a rotor fixed on the other end of the shaft;

a retaining portion formed in the inner circumferential surface of the sleeve member;

a ball bearing including an inner race and an outer race and a plurality of balls disposed therebetween, and interposed between the shaft and the sleeve member, the outer race being fixed to the sleeve member so as to be in contact with the inner circumferential surface of the sleeve member and the retaining portion and the inner race holding the shaft;

a stator attached to the sleeve member;

a rotor magnet secured to the rotor so as to oppose the stator;

a shaft receiving member provided on the housing at a position to oppose the hemispherical end of the shaft and having a curved concave configuration with the radius of curvature R2 which is larger than the radius of curvature R1, the hemispherical end of the shaft and the curved concave portion being in contact with each other by pin point contact; and biasing means for urging the shaft toward the shaft receiving member.

21. A fan motor comprising:

a housing having an air passage way;

a supporting plate having a sleeve member and connected to the housing through a plurality of webs;

a shaft rotatably supported by the sleeve member and the one end of the shaft having a hemispherical configuration with a radius of curvature R1;

a rotor fixed on the other end of the shaft and having a plurality of fan blades;

a retaining portion formed in the inner circumferential surface of the sleeve member;

a ball bearing including an inner race and an outer race and a plurality of balls disposed therebetween, and interposed between the shaft and the sleeve member, the outer race being fixed to the sleeve member so as to be in contact with the inner circumferential surface of the sleeve member and the retaining portion and the inner race holding the shaft;

a stator attached to the base plate;

a rotor magnet secured to the rotor so as to oppose the stator;

a shaft receiving member fixedly mounted on the housing at a position to oppose the hemispherical end of the shaft and having a curved concave configuration with a radius of curvature R2 which is larger than the radius of curvature R1, the hemispherical end of the shaft and the curved concave portion being in contact with each other by pin point contact; and urging means for urging the shaft toward the shaft receiving member.

22. A fan motor comprising:

a housing having an air passage way;

a supporting plate having a sleeve member and connected to the housing through a plurality of webs;

a shaft rotatably supported by the sleeve member and the one end of the shaft having a hemispherical configuration with a radius of curvature R1;

a rotor fixed on the other end of the shaft and having a plurality of fan blades;

a retaining portion formed in the inner circumferential surface of the sleeve member;

a ball bearing including an inner race and an outer race and a plurality of balls disposed therebetween, and interposed between the shaft and the sleeve member, the outer race being fixed to the sleeve member so as to be in contact with the inner circumferential surface of the sleeve member and the retaining portion and the inner race holding the shaft;

a stator attached to the base plate;

a rotor magnet secured to the rotor so as to oppose the stator;

a shaft receiving member fixedly mounted on the base plate at a position to oppose the hemispherical end of the shaft and having a curved concave configuration with a radius of curvature R2 which is larger than the radius of curvature R1, the hemispherical end of the shaft and the curved concave portion being in contact within each other by pin point contact; and urging means for urging the shaft towards the shaft receiving member.

23. A heat sink fan comprising:

a heat sink having a base member and a plurality of radiating fins formed on the base member;

a housing attached to the heat sink and having an air passage;

a supporting plate having a sleeve member and connected to the housing through a plurality of webs;

a shaft rotatably supported by the sleeve member and the one end of the shaft having a hemispherical configuration with a radius of curvature R1;

a rotor fixed on the other end of the shaft and having a plurality of fan blades;

a retaining portion formed in the inner circumferential surface of the sleeve member;

a ball bearing including an inner race and an outer race and a plurality of balls disposed therebetween, and interposed between the shaft and the sleeve member, the outer race being fixed to the sleeve member so as to be in contact with the inner circumferential surface of the sleeve member and the retaining portion and the inner race holding the shaft;

a stator attached to the base plate;

a rotor magnet secured to the rotor so as to oppose the stator;

a shaft receiving member fixedly mounted on the housing at a position to oppose the hemispherical end of the shaft and having a curved concave configuration with a radius of curvature R2 which is larger that the radius of curvature R1, the hemispherical end of the shaft and the curved concave portion being in contact with each other by pin point contact; and urging means for urging the shaft towards the shaft receiving member.

24. A heat sink fan comprising:

a heat sink having a base member and a plurality of radiating fins formed on the base member;

a housing attached to the heat sink and having an air passage;

a supporting plate having a sleeve member and connected to the housing through a plurality of webs;

a shaft rotatably supported by the sleeve member and the one end of the shaft having a hemispherical configuration with a radius of curvature R1;

a rotor fixed on the other end of the shaft and having a plurality of fan blades;

a retaining portion formed in the inner circumferential surface of the sleeve member;

a ball bearing including an inner race and an outer race and a plurality of balls disposed therebetween, and interposed between the shaft and the sleeve member, the outer race being fixed to the sleeve member so as to be in contact with the inner circumferential surface of the sleeve member and the retaining portion and the inner race holding the shaft;

a stator attached to the base plate;

a rotor magnet secured to the rotor so as to oppose the stator;

a shaft receiving member fixedly mounted on the heat sink at a position to oppose the hemispherical end of the shaft and having a curved concave configuration with a radius of curvature R2, which is larger that the radius of curvature R1, the hemispherical end of the shaft and the curved concave portion being in contact with each other by pin point contact; and urging means for urging the shaft towards the shaft receiving member.

25. A DC motor according to claim 19 wherein, a single ball bearing bears a radial load placed on the shaft during the rotation of the rotor and the shaft receiving member bears thrust load placed on the shaft during the rotation of the rotor by urging the shaft toward the shaft receiving member.

26. A DC motor according to claim 19 wherein, a washer is fixed on the shaft so as to be positioned between the inner race of the ball bearing and the hemispherical end of the shaft, the urging means includes a spring member interposed between the inner race of the ball bearing and the washer whereby a force of elastic restitution of the spring member acts to urge the shaft against the shaft receiving member.

27. A DC motor according to claim 20 wherein, a single ball bearing bears a radial load placed on the shaft during the rotation of the rotor and the shaft receiving member bears thrust load placed on the shaft during the rotation of the rotor by urging the shaft toward the shaft receiving member.

28. A DC motor according to claim 20 wherein, a washer is fixed on the shaft so as to be positioned between the inner race of the ball bearing and the hemispherical end of the shaft, the biasing means includes a spring member interposed between the inner race of the ball bearing and the washer whereby a force of elastic restitution of the spring member acts to urge the shaft against the shaft receiving member.

29. A fan motor according to claim 21 wherein, a single ball bearing bears a radial load placed on the shaft during the rotation of the rotor and the shaft receiving member bears thrust load placed on the shaft during the rotation of the rotor by urging the shaft toward the shaft receiving member.

30. A fan motor according to claim 21 wherein, a washer is fixed on the shaft so as to be positioned between the inner race of the ball bearing and the hemispherical end of the shaft, the urging means includes a spring member interposed between the inner race of the ball bearing and the washer whereby a force of elastic restitution of the spring member acts to urge the shaft against the shaft receiving member.

31. A fan motor according to claim 22 wherein, a single ball bearing bears a radial load placed on the shaft during the rotation of the rotor and the shaft receiving member bears thrust load placed on the shaft during the rotation of the rotor by urging the shaft toward the shaft receiving member.

32. A fan motor according to claim 22 wherein, a washer is fixed on the shaft so as to be positioned between the inner race of the ball bearing and the hemispherical end of the shaft, the biasing means includes a spring member interposed between the inner race of the ball bearing and the washer whereby a force of elastic restitution of the spring member acts to urge the shaft against the shaft receiving member.

33. A heat sink fan according to claim 23 wherein, a single ball bearing bears a radial load placed on the shaft during the rotation of the rotor and the shaft receiving member bears thrust load placed on the shaft during the rotation of the rotor by urging the shaft toward the shaft receiving member.

34. A heat sink fan according to claim 23 wherein, a washer is fixed on the shaft so as to be positioned between the inner race of the ball bearing and the hemispherical end of the shaft, the biasing means includes a spring member interposed between the inner race of the ball bearing and the washer whereby a force of elastic restitution of the spring member acts to urge the shaft against the shaft receiving member.

35. A heat sink fan according to claim 24 wherein, a single ball bearing bears a radial load placed on the shaft during the rotation of the rotor and the urging means bears thrust load placed on the shaft during the rotation of the rotor by urging the shaft toward the shaft receiving member.

36. A heat sink fan according to claim 24 wherein, a washer is fixed on the shaft so as to be positioned between the inner race of the ball bearing and the hemispherical end of the shaft, the biasing means includes a spring member interposed between the inner race of the ball bearing and the washer whereby a force of elastic restitution of the spring member acts to urge the shaft against the shaft receiving member.

* * * * *